US012796628B2

(12) United States Patent
Yamaoka et al.

(10) Patent No.: US 12,796,628 B2
(45) Date of Patent: Nov. 17, 2026

(54) BLOWER

(71) Applicant: Nanjing Chervon Industry Co., Ltd., Nanjing (CN)

(72) Inventors: Toshinari Yamaoka, Nanjing (CN); Jianpeng Guo, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 233 days.

(21) Appl. No.: 18/457,110

(22) Filed: Aug. 28, 2023

(65) Prior Publication Data

US 2023/0397546 A1 Dec. 14, 2023

Related U.S. Application Data

(63) Continuation of application No. PCT/CN2022/079932, filed on Mar. 9, 2022.

(30) Foreign Application Priority Data

Apr. 19, 2021 (CN) ......................... 202110417507.7

(51) Int. Cl.
*A01G 20/47* (2018.01)
*F04D 25/06* (2006.01)
(Continued)

(52) U.S. Cl.
CPC ......... *A01G 20/47* (2018.02); *F04D 25/0673* (2013.01); *H01M 50/247* (2021.01); *F04D 25/084* (2013.01); *H01M 2220/30* (2013.01)

(58) Field of Classification Search
CPC ........ A01G 20/47; E01H 1/0809; E01H 1/12; F04D 25/0673; F04D 25/084; H01M 50/204; H01M 50/247; H01M 2220/30
See application file for complete search history.

(56) References Cited

U.S. PATENT DOCUMENTS

2009/0223017 A1 9/2009 Hittmann et al.
2015/0188333 A1* 7/2015 Zhang ................ H01M 50/247 173/217
(Continued)

FOREIGN PATENT DOCUMENTS

CN 1939673 A 4/2007
CN 104074156 A 10/2014
(Continued)

OTHER PUBLICATIONS

ISA/CN, International Search Report issued on PCT application No. PCT/CN2022/079932, dated May 30, 2022, 4 pages.
(Continued)

*Primary Examiner* — Charles G Freay
*Assistant Examiner* — Joseph S. Herrmann
(74) *Attorney, Agent, or Firm* — Greenberg Traurig, LLP

(57) ABSTRACT

A blower includes: a motor; a fan driven by the motor to rotate about a central axis; a battery pack for supplying power to the motor; and a blower tube assembly forming an air inlet for the entry of air and an air outlet for the exit of the air. The blower further includes: a first handle forming a first grip for a hold and a second handle forming a second grip for a hold, where at least part of a projection of the battery pack along a radial direction of the central axis on a plane passing through the central axis is located between the first handle and the second handle.

17 Claims, 7 Drawing Sheets

(51) Int. Cl.
*H01M 50/247* (2021.01)
*F04D 25/08* (2006.01)

(56) References Cited

U.S. PATENT DOCUMENTS

| | | | | |
|---|---|---|---|---|
| 2016/0265540 | A1* | 9/2016 | Tirone | F04D 29/545 |
| 2016/0330913 | A1* | 11/2016 | Shao | F04D 29/545 |
| 2018/0266424 | A1* | 9/2018 | Colley | B60K 8/00 |
| 2019/0090405 | A1* | 3/2019 | Bermudez | A01D 34/90 |
| 2020/0040538 | A1 | 2/2020 | Nkurunziza | |
| 2020/0214229 | A1* | 7/2020 | Yamaoka | F04D 29/403 |
| 2020/0375124 | A1* | 12/2020 | Yang | F04D 25/0673 |
| 2021/0268552 | A1* | 9/2021 | Zha | B05B 15/65 |

FOREIGN PATENT DOCUMENTS

| | | | | | |
|---|---|---|---|---|---|
| CN | 208081679 | U | | 11/2018 | |
| CN | 111893933 | A | | 11/2020 | |
| CN | 112483444 | A | * | 3/2021 | F04D 25/08 |
| CN | 110593176 | A | | 2/2023 | |
| JP | 6300271 | B2 | * | 3/2018 | B27B 17/0008 |

OTHER PUBLICATIONS

ISA/CN, English translation of International Search Report issued on PCT application No. PCT/CN2022/079932, dated May 30, 2022, 2 pages.

ISA/CN, Written Opinion issued on PCT application No. PCT/CN2022/079932, dated May 30, 2022, 3 pages.

ISA/CN, English translation of Written Opinion issued on PCT application No. PCT/CN2022/079932, dated May 30, 2022, 3 pages.

* cited by examiner

BLOWER

This application is a continuation of International Application Number PCT/CN2022/079932, filed on Mar. 9, 2022, through which this application also claims the benefit under 35 U.S.C. § 119(a) of Chinese Patent Application No. CN 202110417507.7, filed on Apr. 19, 2021, which applications are incorporated herein by reference in their entireties.

TECHNICAL FIELD

The present application relates to a power tool and, in particular, to a blower.

BACKGROUND

A blower is a commonly used garden tool, which can help a user clean fallen leaves in a garden with an airflow. When the blower ejects gas, the ejected object generates a recoil force in a reverse direction due to conservation of momentum. As a result, when holding the blower, the user needs to suppress the recoil force generated by the blower to prevent the blower from deflecting. Consequently, the fatigue of the user is increased, which is not conducive to performing an operation for a long time. In addition, in order that the performance of the blower is improved, the weight of a battery pack and the weight of the blower are both increased accordingly, which is not conducive to performing the operation for a long time by the user. As a result, the improvement of the performance of the blower is further limited.

SUMMARY

The present application provides a blower. The blower includes: a motor; a fan driven by the motor to rotate about a central axis; a battery pack for supplying power to the motor; and a blower tube assembly forming an air inlet for the entry of air and an air outlet for the exit of the air. The blower further includes a first handle forming a first grip for a hold and a second handle forming a second grip for a hold, where a first plane passing through the central axis exists, where at least part of the blower tube assembly is distributed symmetrically with respect to the first plane, and a projection of the battery pack on the first plane is at least partially located between a projection of the first handle on the first plane and a projection of the second handle on the first plane.

In some examples, the first handle and the second handle are each located on a side of the blower tube assembly and relatively independent of each other.

In some examples, the battery pack, the first handle, and the second handle are located on the same side of the blower tube assembly, and the battery pack is located between the first handle and the second handle.

In some examples, the battery pack, the first handle, and the second handle are located on the blower tube assembly.

In some examples, the first handle and the second handle are located on the blower tube assembly, and the battery pack is located under the blower tube assembly.

In some examples, the first handle is located behind the blower tube assembly, one of the second handle and the battery pack is located on the blower tube assembly, and the other one of the second handle and the battery pack is located under the blower tube assembly.

In some examples, the central axis passes through at least part of the first grip.

In some examples, the first handle or the second handle is disposed around the blower tube assembly.

In some examples, the battery pack is at least partially located behind the air inlet.

In some examples, when an airflow flows into the blower tube assembly through the air inlet, the battery pack is at least partially located on an extension line of an air path of the inflow airflow.

In some examples, the weight of the battery pack is greater than or equal to 3 kg and less than or equal to 6 kg.

In some examples, the rated power of the motor is greater than or equal to 1200 W and less than or equal to 4000 W, and the air volume of the air outlet of the blower is greater than or equal to 700 cubic feet per minute.

In some examples, the present application provides a blower. The blower includes: a motor; a fan driven by the motor to rotate about a central axis; a battery pack for supplying power to the motor; and a blower tube assembly forming an air inlet for the entry of air and an air outlet for the exit of the air. The blower further includes a first handle forming a first grip for a hold and a second handle forming a second grip for a hold. The rated power of the motor is greater than or equal to 1200 W and less than or equal to 4000 W, and the air volume of the air outlet of the blower is greater than or equal to 700 cubic feet per minute.

In some examples, the battery pack is detachably connected to the blower, and the overall weight of the blower with no battery pack mounted is greater than or equal to 1.8 kg and less than or equal to 3 kg.

In some examples, the diameter of the fan is larger than or equal to 85 mm and smaller than or equal to 100 mm.

In some examples, the present application provides a blower. The blower includes: a motor; a fan driven by the motor to rotate about a central axis; a battery pack coupling portion for connecting a battery pack for supplying power to the motor; and a blower tube assembly forming an air inlet for the entry of air and an air outlet for the exit of the air. The blower further includes a first handle forming a first grip for a hold and a second handle forming a second grip for a hold, where a first plane passing through the central axis is defined, where at least part of the blower tube assembly is distributed symmetrically with respect to the first plane, at least part of an orthographic projection of the battery pack coupling portion on the first plane is located between a projection of the first handle on the first plane and a projection of the second handle on the first plane.

Benefits are described below. In the present application, a double-handle structure is provided and the position of the battery pack is configured so that the distance between the position where the blower is held by a user and a recoil force generated when the blower runs is reduced. In addition, it is convenient for the user to operate the blower with the double-handle structure so that the weight and capacity of the battery pack can be increased accordingly, thereby increasing the volume of air exiting from the blower and reducing the burden on the user. Specifically, the moment of force generated at the hold position by the recoil force generated when the blower runs is reduced so that the burden on the user during the use of the blower is reduced.

DETAILED DESCRIPTION

Figure 1:
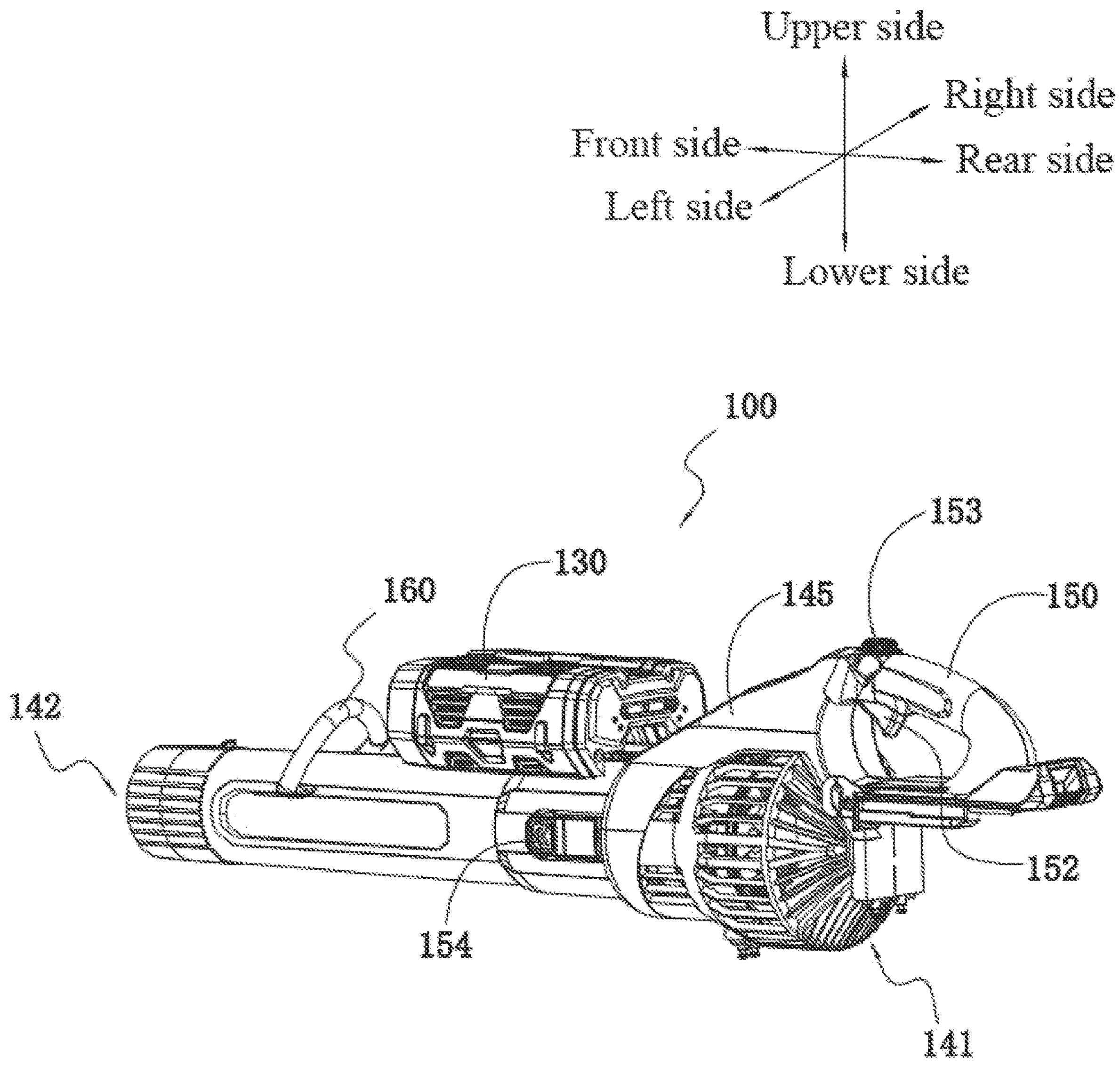
FIG. 1 is a perspective view of a blower according to a first example of the present application.

Examples of the present application are described below in detail with reference to the drawings. The same or similar reference numerals indicate the same or similar elements or elements having the same or similar functions. The examples described below with reference to the drawings are only intended to explain the present application and are not to be construed as limiting the present application.

In the description of the present application, the terms "joined", "connected", and "fixed" are to be understood in a broad sense unless otherwise expressly specified and limited. For example, the term "connected" may refer to "fixedly connected", "detachably connected", or integrated, may refer to "mechanically connected" or "electrically connected", or may refer to "connected directly", "connected indirectly through an intermediary", "connected inside two elements", or "interaction relations between two elements". For those of ordinary skill in the art, specific meanings of the preceding terms in the present application may be understood based on specific situations.

The present application is described below in detail in conjunction with the drawings and the examples.

Figure 2:
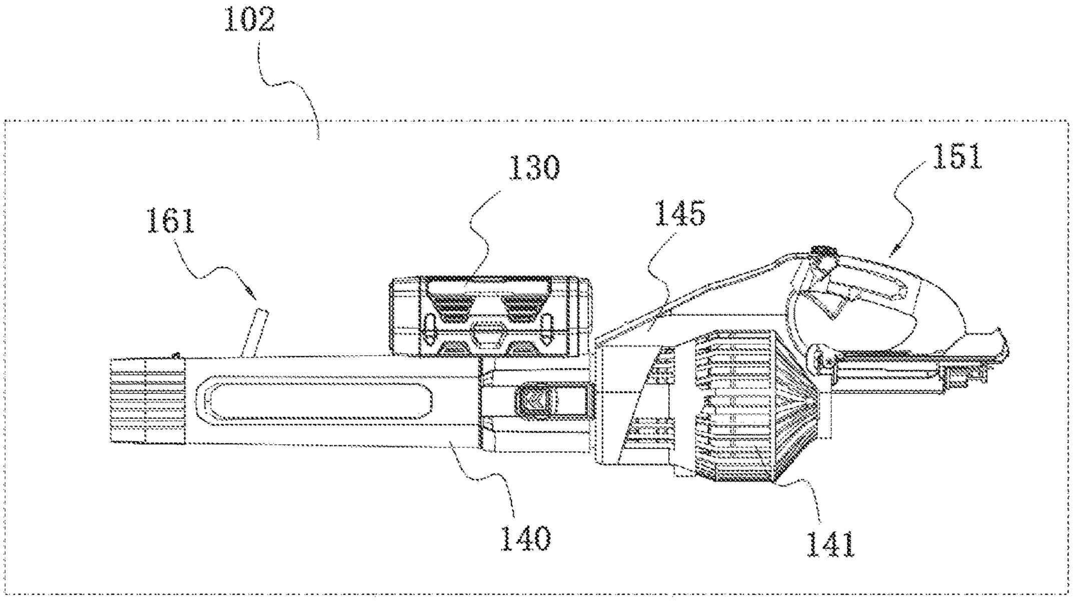
FIG. 2 is a plan view of the blower in FIG. 1.
Figure 3:
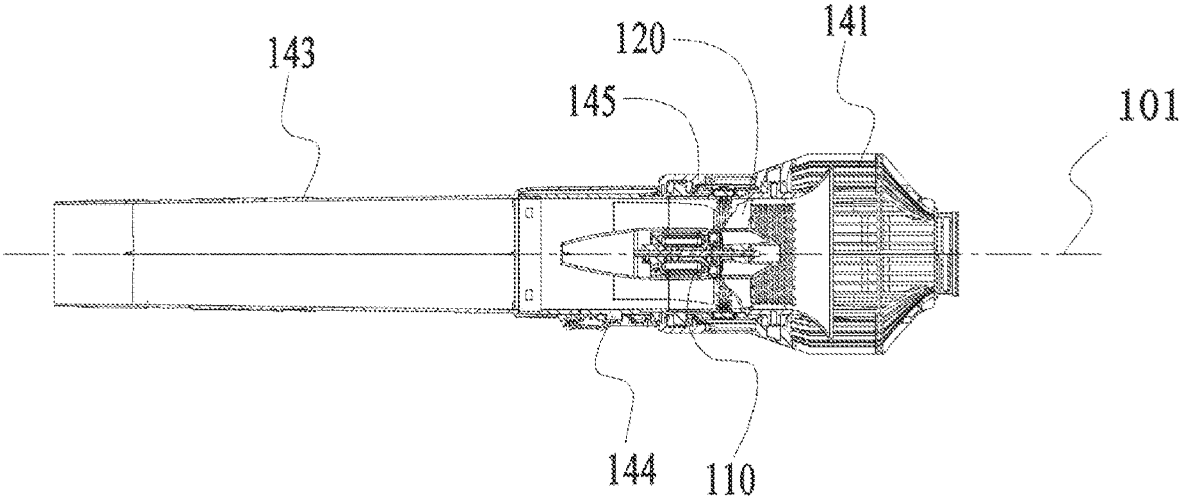
FIG. 3 is a sectional view of the blower in FIG. 1.

Referring to FIGS. 1 to 3, in an example of the present application, a blower 100 includes a motor 110, a fan 120, a battery pack 130, a blower tube assembly 140, and a first handle 150. The blower tube assembly 140 forms an air inlet 141 for the entry of air and an air outlet 142 for the exit of the air. The fan 120 is driven by the motor 110 to rotate about a central axis 101, and the battery pack 130 is used for supplying power to the motor 110. The fan 120 rotates to guide an airflow to enter the inside of the blower tube assembly 140 from the air inlet 141 and exit from the air outlet 142. The airflow is used for assisting in cleaning fallen leaves or other debris. The blower 100 further includes a switch 152 for controlling the start and stop of the machine, an air speed adjustment button 153 for adjusting the speed at which the air exits, and a maximum air speed key 154 for maintaining the blower 100 at the maximum air speed. In a first example, the switch 152 is disposed at the first handle 150. When the switch 152 is pulled, the blower 100 starts working. When the switch 152 is released, the blower 100 stops working. Specifically, the switch 152 is a trigger. Before the switch 152 is turned on, the air speed adjustment button 153 needs to be adjusted to a required speed at which the air exits, and then the switch 152 is turned on for performing a blowing operation. When a local area with a relatively enormous operation difficulty is encountered during the blowing operation, the speed at which the air exits may be temporarily adjusted to the maximum air speed through the maximum air speed key 154. When the maximum air speed does not need to be used, the state of the maximum air speed key 154 is changed so that a current air speed of the blower 100 returns to a speed specified by the air speed adjustment button 153. In some examples, the switch 152 is disposed at another position of the blower 100 instead of the handle.

The blower 100 further includes the first handle 150 forming a first grip 151 for a hold and a second handle 160 forming a second grip 161 for a hold. The first handle 150 is disposed behind the second handle 160, and the first handle 150 and the second handle 160 are configured to be relatively independent of each other. When operating the blower 100, the user may hold the first grip 151 of the first handle 150 and the second grip 161 of the second handle 160 with two hands separately so that the blower 100 can be operated more stably. Specifically, the first handle 150 is located substantially on the air inlet 141 and behind the air inlet 141, and the second handle 160 is located at a position which is on the blower tube assembly 140 and near the air outlet.

When the user holds the first handle 150 and the second handle 160 and uses the blower for performing a blow, the airflow is ejected outward through the air outlet 142 substantially along a first direction parallel to the central axis 101. In this case, the user is subjected to a recoil force generated by the ejection of the airflow, where the recoil force is substantially in a second direction opposite to the first direction. The recoil force generates the moment of force on the grip. To prevent the moment of force from driving the position of the whole blower 100 to be deflected, the user needs to give a force to overcome the moment of force in addition to bearing the gravity of the blower 100. There is a certain distance between the first handle 150 and the second handle 160, and the second handle 160 is provided so that the user can more easily overcome the moment of force generated by the recoil force, thereby making better use of the blower 100.

The switch 152 for controlling the motor 110 is disposed on the first handle 150. The user holds the first handle 150 and can press the switch 152 to control the running of the motor 110 when holding the first handle 150. The blower tube assembly 140 includes a first blower tube 143 and a second blower tube 144. The first blower tube 143 and the second blower tube 144 partially overlap each other. Specifically, part of the second blower tube 144 is disposed in the first blower tube 143, and the air outlet 142 is disposed at an end of the first blower tube 143. The blower 100 further includes a connection portion 145 and a hood, where the connection portion 145 connects the second blower tube 144 to the first handle 150, the connection portion 145 is configured to be open so that the air inlet 141 is formed, and the hood covers the outside of the air inlet 141. A flow guide cone for fixing the motor 110 is formed in the second blower tube 144, where the motor 110 is disposed in the flow guide cone, and the fan 120 is disposed behind the flow guide cone. The motor 110 includes a rotatable shaft of the motor 110, where the shaft of the motor 110 extends out from the inside of the flow guide cone and is connected to the fan 120, and the fan 120 can be driven by the shaft of the motor 110 to rotate about the central axis 101.

In some examples, the switch 152 is disposed on the second handle 160 and the user can control the switch 152 to be turned on or off when holding the second handle 160.

In the first example of the present application, the first handle 150 and the second handle 160 are each located on a side of the blower tube assembly 140 and relatively independent of each other. The first handle 150 and the second handle 160 may be disposed on the blower tube assembly 140. The blower 100 is further provided with a base disposed under the blower 100. Specifically, the base is located under the blower tube assembly 140. The base is disposed opposite to the first handle 150 and the second handle 160 and used for supporting the blower 100 on a plane. When the blower 100 is not required to be used, the blower 100 may be placed on the base so that the blower 100 does not easily tumble, which facilitates safe storage.

The battery pack 130, the first handle 150, and the second handle 160 are located on the same side of the blower tube assembly 140, and the battery pack 130 is located between the first handle 150 and the second handle 160. The battery pack 130 is connected to a battery pack coupling portion of the blower 100.

A first plane 102 passing through the central axis 101 exists, where at least part of the blower tube assembly 140 is distributed symmetrically with respect to the first plane 102, and a projection of the battery pack 130 on the first plane 102 is at least partially located between a projection of the first handle 150 on the first plane and a projection of the second handle 160 on the first plane.

In some examples, the battery pack 130, the first handle 150, and the second handle 160 are located on the blower tube assembly 140. A gap is disposed between the first handle 150 and the second handle 160, and the battery pack 130 is placed into the gap so that at least part of a projection of the battery pack 130 along a radial direction of the central axis 101 is located between the first handle 150 and the second handle 160, thereby making the balance of the blower 100 better. The overall center of gravity of the blower 100 to which the battery pack 130 is mounted is located between the first handle 150 and the second handle 160 or located in a projection of the first handle 150 or a projection of the second handle 160 in the radial direction of the central axis 101, thereby facilitating the hold of the user and improving the user's comfort in using the blower 100. In some examples, the projection of the battery pack 130 along the radial direction of the central axis 101 is located between the first handle 150 and the second handle 160, and the projection of the battery pack 130 in this direction does not overlap the projection of the first handle 150 or the projection of the second handle 160 in this direction.

Double handles are disposed so that the burden on the user during the use of the blower 100 can be reduced. The weight of the battery pack 130 which can be mounted to the blower 100 is increased so that the performance of the battery pack 130 can be improved. In some examples, the weight of the battery pack 130 is set to be greater than or equal to 3 kg and less than or equal to 6 kg. In some examples, the weight of the battery pack 130 is set to be greater than or equal to 3.5 kg and less than or equal to 6 kg. In some examples, the weight of the battery pack 130 is set to be greater than or equal to 4 kg and less than or equal to 6 kg.

Accordingly, the rated power of the motor 110 can be set to be greater than or equal to 1500 W and less than or equal to 4000 W, and the diameter of the fan 120 is larger than or equal to 85 mm and smaller than or equal to 100 mm so that the air volume of the blower 100 at the air outlet 142 can be greater than or equal to 700 cubic feet per minute. Thus, the air volume of the blower 100 is increased and the battery life of the blower 100 can be prolonged. The battery pack 130 is detachably connected to the blower 100, and the overall weight of the blower 100 with no battery pack 130 mounted is greater than or equal to 1.8 kg and less than or equal to 3 kg. In some examples, the blower 100 is provided with no base.

In some examples, the rated power of the motor 110 can be set to be greater than or equal to 1500 W and less than or equal to 4000 W, and the diameter of the fan 120 is larger than or equal to 80 mm and smaller than or equal to 110 mm so that the air volume of the blower 100 at the air outlet 142 can be greater than or equal to 600 cubic feet per minute and less than or equal to 1000 cubic feet per minute. Thus, the air volume of the blower 100 is increased and the battery life of the blower 100 can be prolonged. The battery pack 130 is detachably connected to the blower 100, and the overall weight of the blower 100 with no battery pack 130 mounted is greater than or equal to 1.5 kg and less than or equal to 4 kg.

In some examples, the rated power of the motor 110 can be set to be greater than or equal to 1200 W and less than or equal to 4000 W. In some examples, the rated power of the motor 110 can be set to be greater than or equal to 1300 W and less than or equal to 4000 W. In some examples, the rated power of the motor 110 can be set to be greater than or equal to 1400 W and less than or equal to 4000 W. In some examples, the rated power of the motor 110 can be set to be greater than or equal to 1500 W and less than or equal to 4000 W. In some examples, the rated power of the motor 110 can be set to be greater than or equal to 1600 W and less than or equal to 4000 W.

Figure 4:
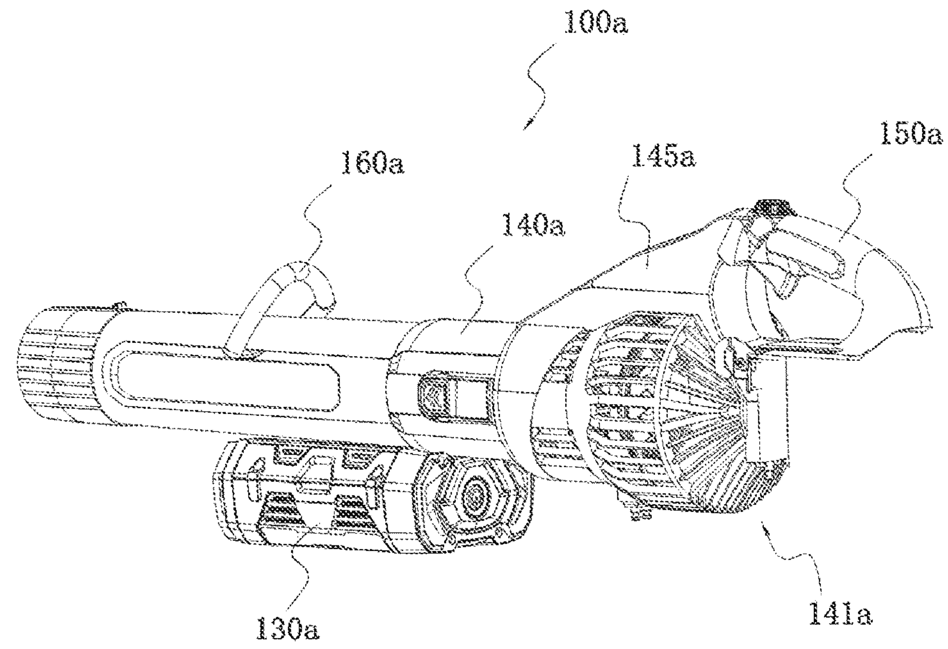
FIG. 4 is a perspective view of a blower according to a second example of the present application.
Figure 5:
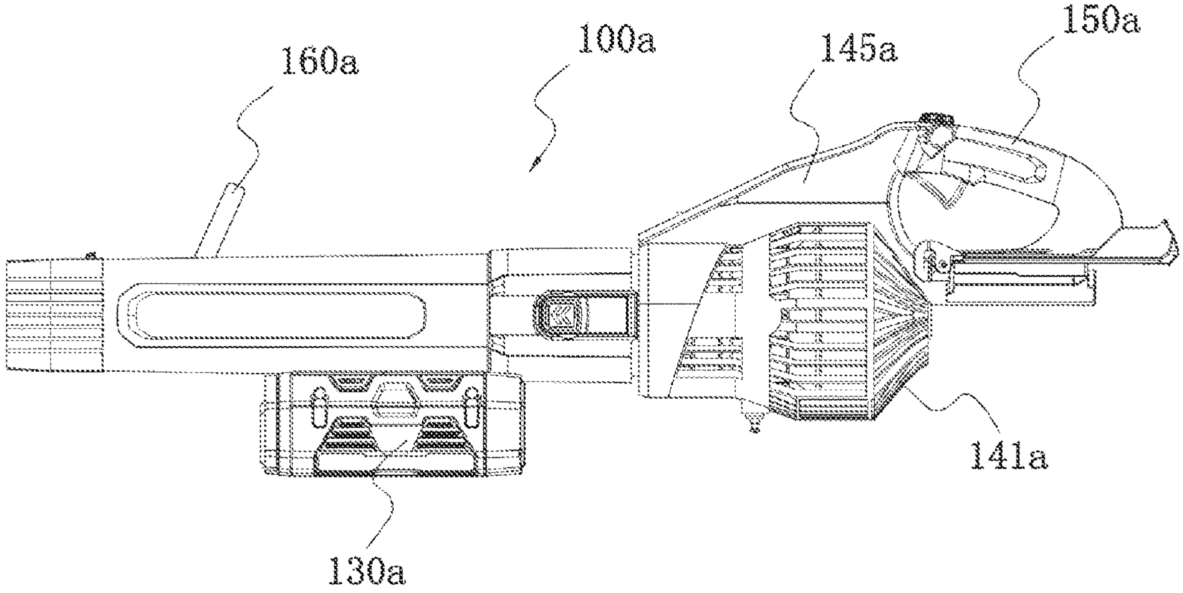
FIG. 5 is a plan view of the blower in FIG. 4.

Referring to FIGS. 4 and 5, in a second example of the present application, a first handle 150*a* and a second handle 160*a* are located on a blower tube assembly 140*a*, and a battery pack 130*a* is located under the blower tube assembly 140*a*. At least part of a projection of the battery pack 130*a* along a radial direction of a central axis is located between the first handle 150*a* and the second handle 160*a*, thereby making the balance of a blower 100*a* better. The overall center of gravity of the blower 100*a* to which the battery pack 130*a* is mounted is located between the first handle 150*a* and the second handle 160*a* or located in a projection of the first handle 150*a* or a projection of the second handle 160*a* in the radial direction of the central axis, thereby facilitating the hold of the user and reducing the user's fatigue during the use of the blower 100*a*. A connection portion 145*a* connects the blower tube assembly 140*a* to the first handle 150*a*, and the lower end of the connection portion 145*a* is connected to a hood enclosing an air inlet 141*a*. In some examples, the projection of the battery pack 130*a* along the radial direction of the central axis is located between the first handle 150*a* and the second handle 160*a*, and the projection of the battery pack 130*a* in this direction does not overlap the projection of the first handle 150*a* or the projection of the second handle 160*a* in this direction. The blower further includes a base for supporting the blower so that the blower can stand on a plane. In some examples, the battery pack is connected to the base. In some examples, the blower is provided with no base.

Figure 6:
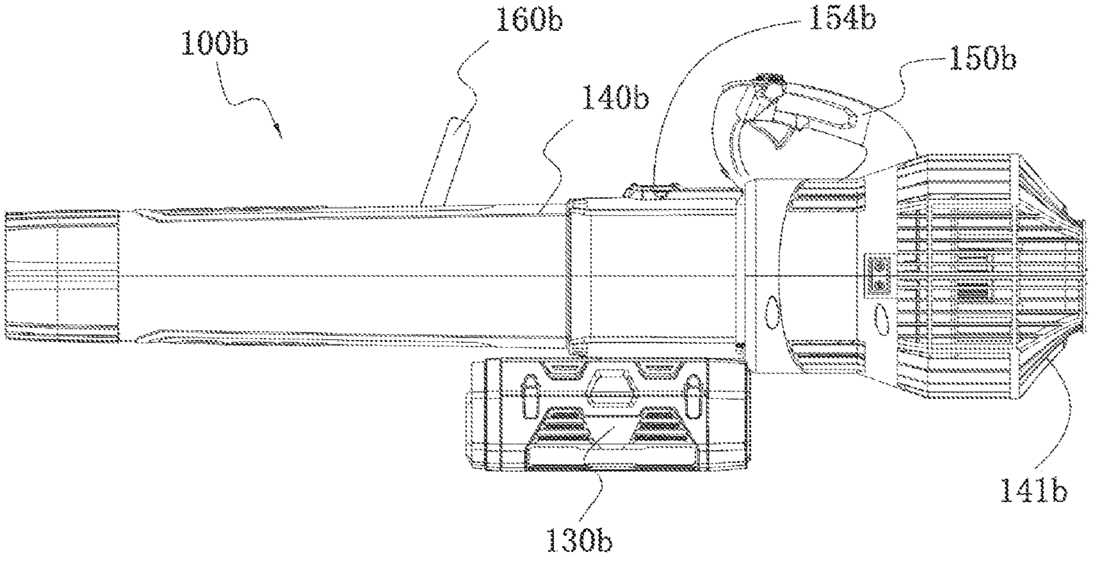
FIG. 6 is a plan view of a blower according to a third example of the present application.

Referring to FIG. 6, in a third example of the present application, a first handle 150*b*, a second handle 160*b*, and a battery pack 130*b* of a blower 100*b* are each in front of an air inlet 141*b*, and the first handle 150*b*, the second handle 160*b*, and the battery pack 130*b* are each connected to a blower tube assembly 140*b*. In this example, the first handle 150*b* is directly connected to the blower tube assembly 140*b*, and a maximum air speed key is located on the blower tube assembly 140*b*. Specifically, a maximum air speed key 154*b* is located above the battery pack 130*b* to facilitate the operation of an operator.

Figure 7:
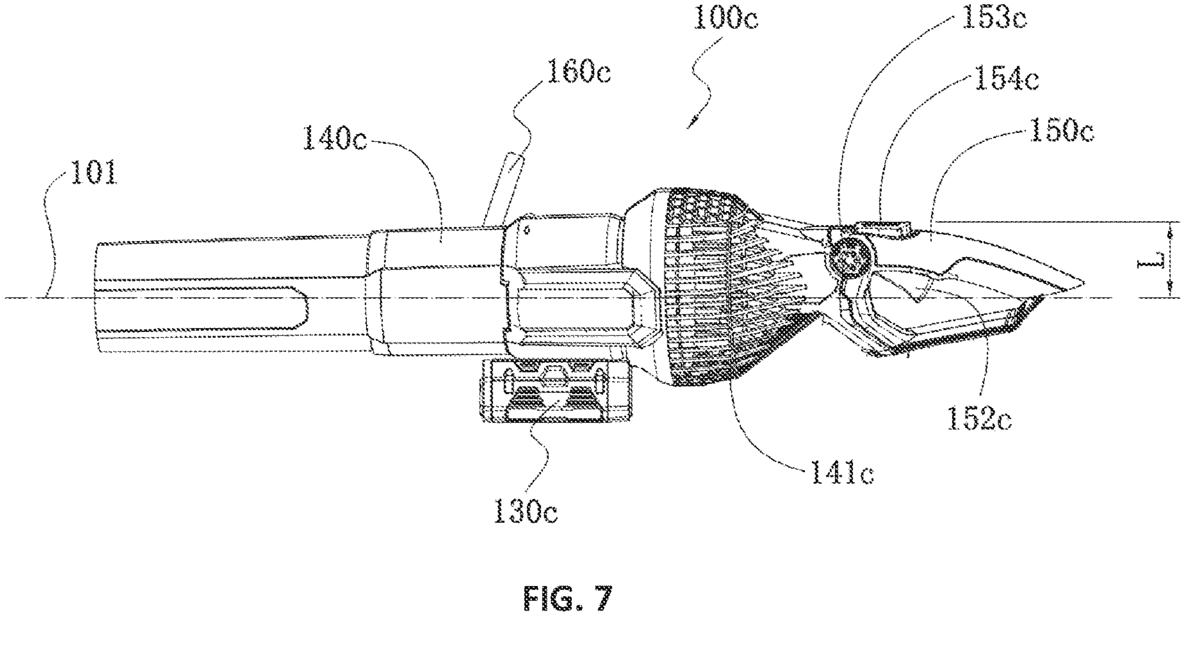
FIG. 7 is a plan view of a blower according to a fourth example of the present application.

Referring to FIG. 7, in a fourth example of the present application, a first handle 150*c* of a blower 100*c* is located behind a blower tube assembly 140*c*, and a second handle

160*c* of the blower 100*c* is located on the blower tube assembly 140*c*. In some examples, a battery pack 130*c* is located between the first handle and the second handle and located on the blower tube assembly 140*c*. At least part of a projection of the battery pack 130*c* along a radial direction of a central axis is located between the first handle 150*c* and the second handle 160*c*, thereby making the balance of the blower 100*c* better. In some examples, the battery pack 130*c* is located between the first handle and the second handle, in front of an air inlet 141*c*, and under the blower tube assembly 140*c*. A maximum air speed key 154*c* is adjusted to the top of the first handle 150*c* in the form of a button, and an air speed adjustment button 153*c* is adjusted to a side surface of the first handle 150*c*. Thus, it is convenient for an operator to press the maximum air speed key 154*c* with a thumb while pressing a switch 152*c*. This operation is easy and convenient. The maximum air speed key 154*c* is adjusted to a position above the switch 152*c*, and similarly, this position may be conveniently touched by a finger of a hand for a hold when the blower 100*c* is held.

Figure 8:
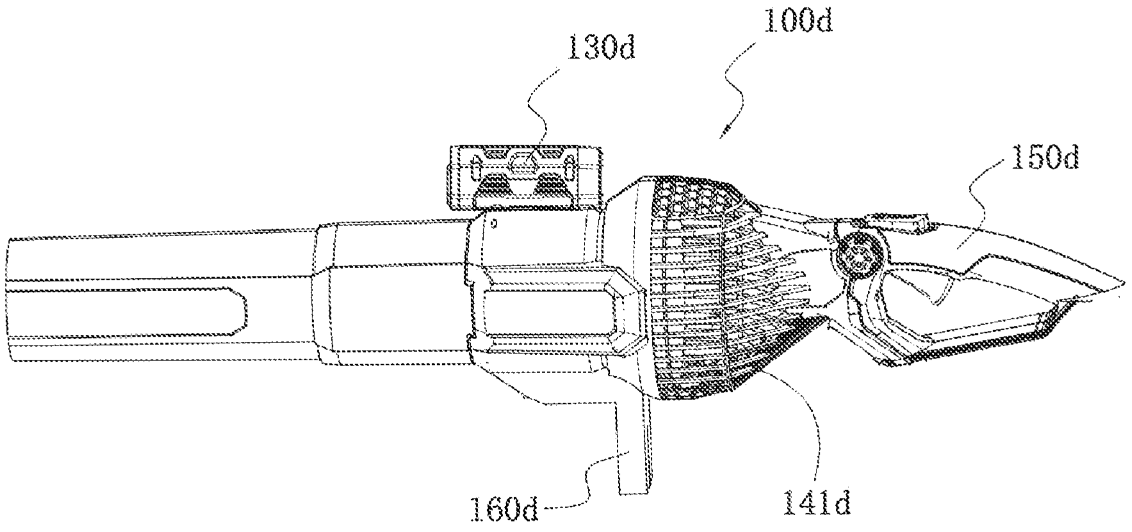
FIG. 8 is a plan view of a blower according to a fifth example of the present application.
Figure 9:
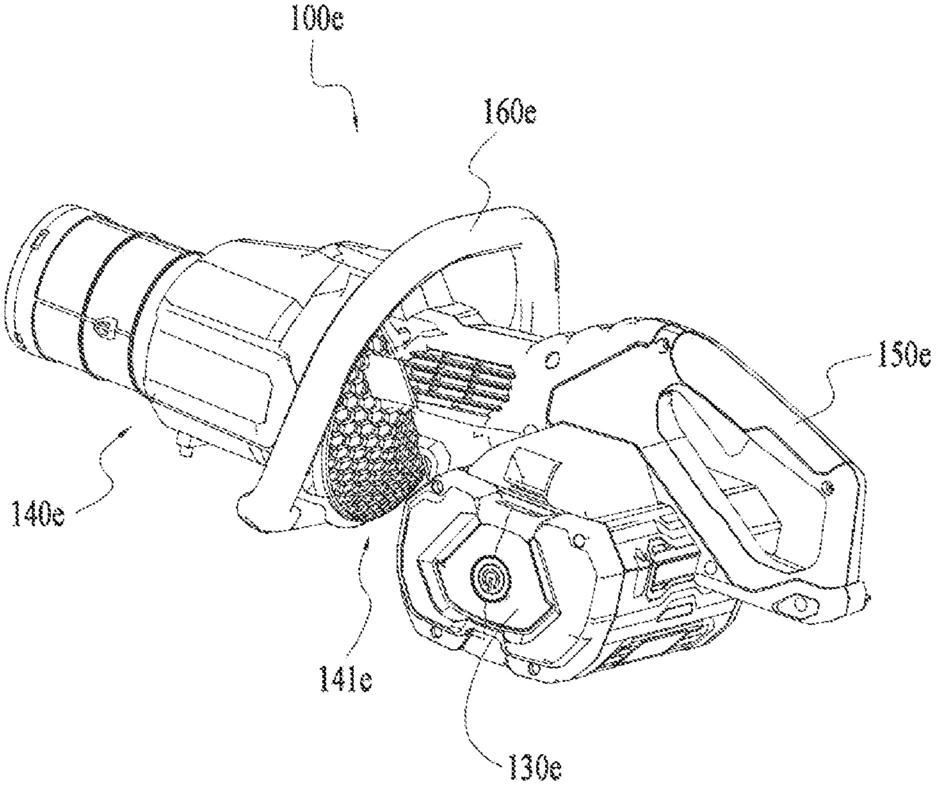
FIG. 9 is a perspective view of a blower according to a sixth example of the present application.
Figure 10:
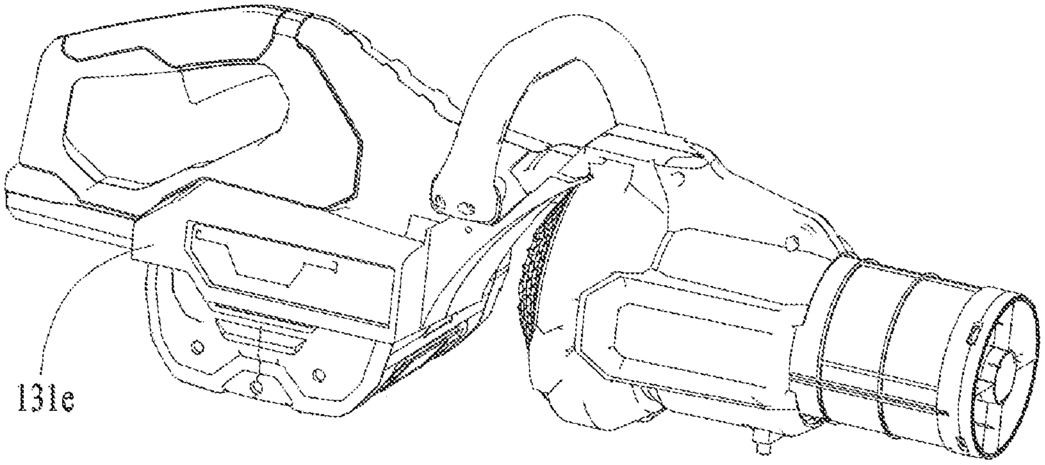
FIG. 10 is a schematic view of the blower in FIG. 9 from another angle.

Referring to FIG. 8, in a fifth example of the present application, a first handle 150*d* of a blower 100*d* is located behind a blower tube assembly, and a second handle 160*d* of the blower 100*d* is located under the blower tube assembly. Specifically, the second handle 160*d* is located at a position under the blower tube assembly and near a hood of an air inlet 141*d*.

The first handle 150*c* in FIG. 7 and the first handle 150*d* in FIG. 8 are based on the same design concept. As shown in FIG. 7, the vertical distance between the highest point of the first grip 151 and the central axis 101 is a first distance L. In the fourth and fifth examples, the first distance L is less than or equal to 140 mm.

In the related art, the first handle 150 of the blower 100 is mostly similar to the first handles in FIGS. 1, 4, and 6, that is, the highest point of the first handle 150 is significantly higher than the highest point of the blower tube assembly 140. However, for a blower 100 with power of greater than 1200 W, a blower 100 with power of greater than 1600 W, or a blower 100 with power of greater than 2000 W in some examples, if the position of the first handle 150 is lowered so that the first grip 151 is as near to the central axis 101 as possible, the counteraction of huge torsion generated when the blower 100 with relatively high power works is facilitated and the user experience of the operator is optimized. Thus, the central axis 101 passes through at least part of the first grip.

In some examples, the first handle or the second handle is disposed around the blower tube assembly.

Referring to FIGS. 9 to 12, in a sixth example of the present application, a second handle 160*e* of a blower 100*e* is disposed around a blower tube assembly 140*e*. Specifically, the second handle 160*e* has a spiral shape and is disposed around the blower tube assembly 140*e*. Further, according to directional legends in FIG. 1, the operator may hold the second handle 160*e* from the upper side, the left side, the right side, and the like of the second handle 160*e*. This example provides various hold angles so that the operation is more flexible and convenient.

Figure 11:
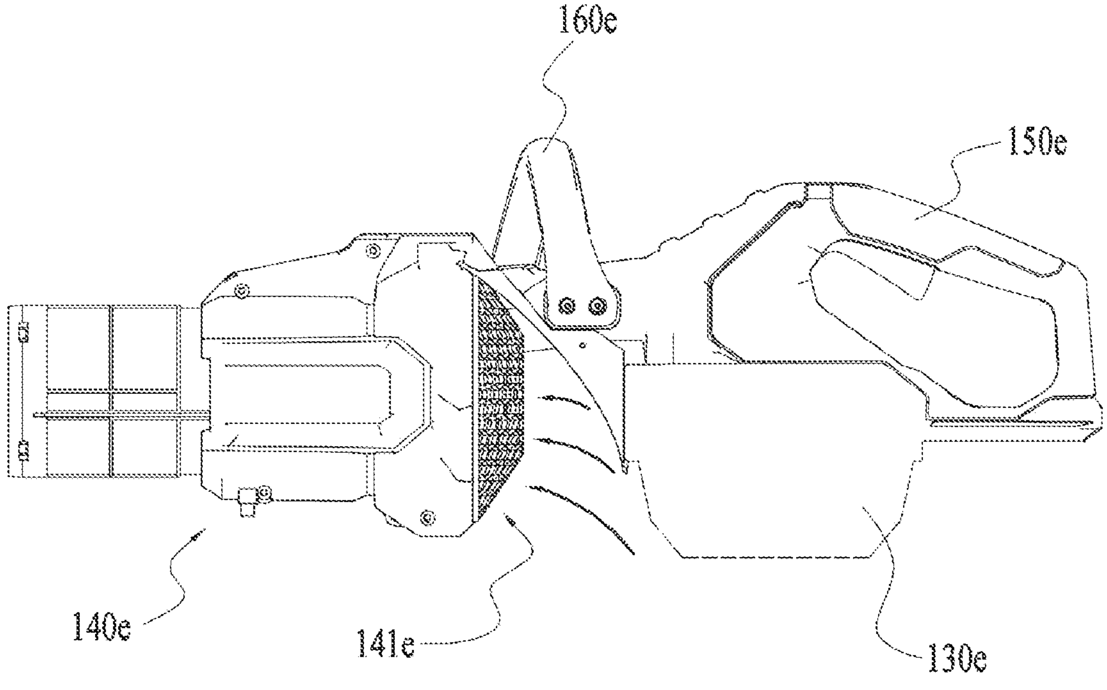
FIG. 11 is a side view of the blower in FIG. 9.
Figure 12:
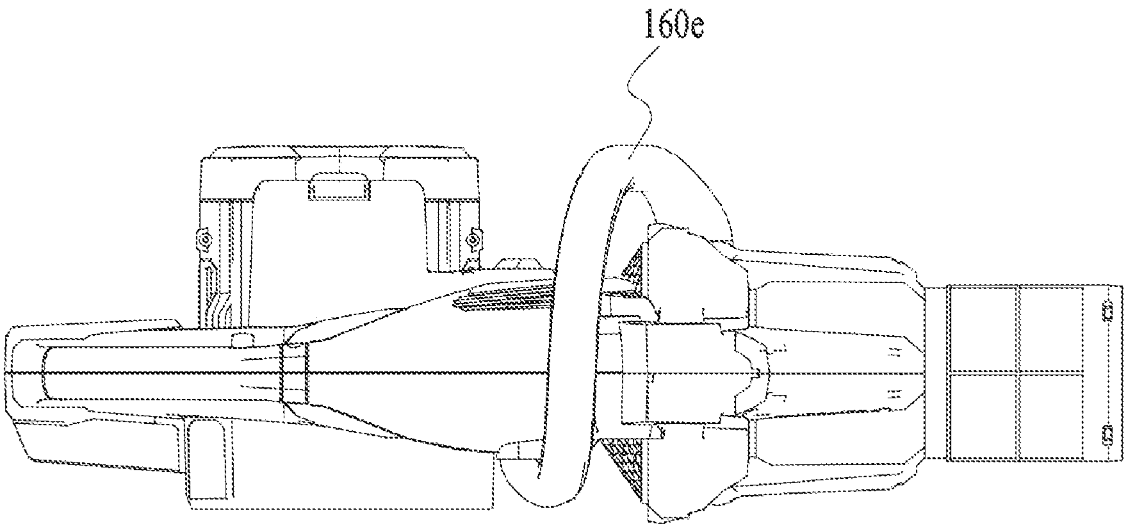
FIG. 12 is a top view of the blower in FIG. 9.

The first handle 150*e* is located behind the second handle 160*e* and the blower tube assembly 140*e*. The first handle 150*e* in this example is nearer to the central axis 101 than the first handles in the first, second and third examples. An air inlet 141*e* is located substantially below the second handle 160*e*, and a battery pack 130*e* is located substantially under the first handle 150*e* and at least partially located behind the air inlet 141*e*. The battery pack 130*e* and the first handle 150*e* are configured in this manner so that the center of gravity of the blower 100*e* is near the central axis 101, thereby improving the comfort of the hold. As shown in FIG. 11, an approximate track of an air duct through which the airflow flows is shown behind the air inlet 141*e*, and when the airflow flows into the blower tube assembly 140*e* through the air inlet 141*e*, the battery pack 130*e* is at least partially located on an extension line of an air path of the inflow airflow.

The blower 100*e* includes a battery pack coupling portion 131*e* for connecting the battery pack 130*e* for supplying power to the motor 110. During an actual design, the battery pack 130*e* may be designed to be inserted from a side of the first handle 150*e*. For example, the battery pack 130*e* may be inserted from left to right into the battery pack coupling portion 131*e* accommodating the battery pack 130*e*, inserted from right to left into the battery pack coupling portion 131*e* accommodating the battery pack 130*e*, or inserted from a lower side to an upper side into the battery pack coupling portion 131*e* accommodating the battery pack 130*e*. It is to be understood that for each of the preceding examples, the battery pack coupling portion may be disposed in an open environment, a semi-open environment, or a completely closed environment, which does not affect the technical effect of the present application and falls within the scope of the present application.

To sum up, in the first to sixth examples disclosed in FIGS. 1 to 12, the at least part of the projection of the battery pack along the radial direction of the central axis 101 on the plane passing through the central axis 101 is located between the first handle 150 and the second handle 160. This plane passing through the central axis 101 may be a plane which is along an up and down direction and passes through the central axis 101. In this case, the at least part of the projection of the battery pack along the radial direction of the central axis 101 on this plane is located between the first handle 150 and the second handle 160.

In the present application, unless otherwise expressly specified and limited, when a first feature is described as "on" or "under" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

What is claimed is:

1. A leaf blower gardening tool, comprising:

a blower tube assembly defining an air passage and forming an air inlet through which air enters the air passage and an air outlet through which the air exits the air passage;

a motor supported by the blower tube assembly and comprising a shaft;

a fan disposed in the air passage and coupled to the shaft so as to be driven by the motor to rotate about a central axis to move the air from the air inlet toward the air outlet;

a battery pack coupling portion coupled to the blower tube assembly;

a battery pack detachably coupled to the battery pack coupling portion and configured to supply power to the motor;

a first handle connected to the blower tube assembly behind the air inlet and forming a first grip configured to be held by a user; and a second handle having a spiral shape and disposed at least partially around the blower tube assembly in front of the first handle, the second handle comprising a top portion, a left portion, and a right portion, wherein the top portion connects the left portion to the right portion, and the top portion, the left portion, and the right portion can each be held by the user, wherein the first handle is located above at least part of the battery pack coupling portion; and wherein the battery pack, the first handle, and the second handle are located on a same side of the blower tube assembly, and the battery pack is located between the first handle and the second handle.

2. The leaf blower gardening tool according to claim 1, wherein the central axis passes through at least part of the first grip.

3. The leaf blower gardening tool according to claim 1, wherein the battery pack is at least partially located behind the air inlet.

4. The leaf blower gardening tool according to claim 3, wherein, when an airflow flows into the blower tube assembly through the air inlet, the battery pack is at least partially located on an extension line of an air path of the inflow airflow.

5. The leaf blower gardening tool according to claim 1, wherein a weight of the battery pack is greater than or equal to 3 kg and less than or equal to 6 kg.

6. The leaf blower gardening tool according to claim 5, wherein a rated power of the motor is greater than or equal to 1200 W and less than or equal to 4000 W, and an air volume of the air outlet of the leaf blower gardening tool is greater than or equal to 700 cubic feet per minute.

7. A garden blower, comprising:

a motor;

a fan driven by the motor to rotate about a central axis;

a battery pack for supplying power to the motor;

a blower tube assembly forming an air inlet for an entry of air and an air outlet for an exit of the air;

a first handle forming a first grip and located behind the blower tube assembly; and a second handle forming a second grip and located in front of the first handle, the second handle being a tubular structure, a first end of the second handle being mounted proximate a left side of the blower tube assembly, a second end of the second handle being mounted on a right side of the blower tube assembly, and the second handle together with the blower tube assembly defining a closed space;

wherein the central axis passes through at least part of the first grip, and a rated power of the motor is greater than or equal to 1200 W and less than or equal to 4000 W, and an air volume of the air outlet of the garden blower is greater than or equal to 700 cubic feet per minute.

8. The garden blower according to claim 7, wherein the battery pack is detachably connected to the garden blower, and an overall weight of the garden blower with no battery pack mounted is greater than or equal to 1.8 kg and less than or equal to 3 kg.

9. The garden blower according to claim 7, wherein a diameter of the fan is larger than or equal to 85 mm and smaller than or equal to 100 mm.

10. A blower, comprising:

a motor;

a fan driven by the motor to rotate about a central axis;

a battery pack coupling portion for connecting a battery pack for supplying power to the motor;

the battery pack for supplying the power to the motor and connected to the battery pack coupling portion;

a blower tube assembly forming an air inlet for an entry of air and an air outlet for an exit of the air;

a first handle forming a first grip for a user to hold and located behind the blower tube assembly; and a second handle forming a second grip for the user to a hold and located in front of the first handle;

wherein a first plane passing through the central axis is defined, the first plane being along an up and down direction, at least part of the blower tube assembly is distributed symmetrically with respect to the first plane, and at least part of an orthographic projection of the battery pack coupling portion on the first plane is located between a projection of the first handle on the first plane and a projection of the second handle on the first plane, wherein the battery pack is located substantially under the first handle, wherein the first grip is symmetrically aligned with respect to the first plane, and wherein the second handle is disposed at least partially around the blower tube assembly and the first plane passes through the second handle.

11. The blower according to claim 10, wherein the central axis passes through at least part of the first grip.

12. The blower according to claim 10, wherein the battery pack is at least partially located behind the air inlet.

13. The blower according to claim 12, wherein, when an airflow flows into the blower tube assembly through the air inlet, the battery pack is at least partially located on an extension line of an air path of the inflow airflow.

14. The blower according to claim 10, wherein a weight of the battery pack is greater than or equal to 3 kg and less than or equal to 6 kg.

15. The blower according to claim 10, wherein a rated power of the motor is greater than or equal to 1200 W and less than or equal to 4000 W, and an air volume of the air outlet of the leaf blower gardening tool is greater than or equal to 700 cubic feet per minute.

16. The blower according to claim 10, wherein the battery pack is detachably connected to the garden blower, and an overall weight of the garden blower with no battery pack mounted is greater than or equal to 1.8 kg and less than or equal to 3 kg.

17. The blower according to claim 10, wherein a diameter of the fan is larger than or equal to 85 mm and smaller than or equal to 100 mm.

* * * * *